(12) United States Patent
Terada

(10) Patent No.: US 10,599,384 B2
(45) Date of Patent: Mar. 24, 2020

(54) AUDIO SIGNAL PROCESSING DEVICE

(71) Applicant: YAMAHA CORPORATION, Hamamatsu-shi, Shizuoka-ken (JP)

(72) Inventor: Kotaro Terada, Hamamatsu (JP)

(73) Assignee: YAMAHA CORPORATION, Hamamatsu-Shi (JP)

(*) Notice: Subject to any disclaimer, the term of this patent is extended or adjusted under 35 U.S.C. 154(b) by 219 days.

(21) Appl. No.: 15/079,761

(22) Filed: Mar. 24, 2016

(65) Prior Publication Data
US 2016/0283188 A1 Sep. 29, 2016

(30) Foreign Application Priority Data
Mar. 25, 2015 (JP) .................. 2015-063058

(51) Int. Cl.
G06F 3/16 (2006.01)

(52) U.S. Cl.
CPC .................... G06F 3/165 (2013.01)

(58) Field of Classification Search
None
See application file for complete search history.

(56) References Cited

U.S. PATENT DOCUMENTS

| | | | | |
|---|---|---|---|---|
| 6,839,441 B1* | 1/2005 | Powers | ................... | H04H 60/04 381/119 |
| 6,868,162 B1* | 3/2005 | Jubien | ...................... | H03G 5/22 381/107 |
| 6,985,595 B2* | 1/2006 | Kohyama | ............... | H04H 60/04 381/119 |
| 7,392,103 B2* | 6/2008 | Takahashi | ............... | H04H 60/04 381/119 |
| 7,742,609 B2* | 6/2010 | Yeakel | .................... | H04H 60/04 369/3 |
| 8,006,184 B2* | 8/2011 | Holtz | ..................... | G06F 3/1431 715/719 |
| 8,098,850 B2* | 1/2012 | Terada | ...................... | H04S 7/00 381/119 |
| 8,170,240 B2* | 5/2012 | Suzuki | ................ | G06F 3/04847 381/119 |
| 8,340,324 B2* | 12/2012 | Terada | ................. | G11B 27/038 381/102 |
| 8,498,432 B2* | 7/2013 | Suyama | ................. | H04H 60/04 369/4 |
| 9,086,801 B2* | 7/2015 | Yasui | .................... | G06F 1/1688 |

(Continued)

OTHER PUBLICATIONS

Creating New Audio Objects, Jul. 1, 2014, 4 pages (Year: 2014).*

(Continued)

Primary Examiner — Yongjia Pan
(74) Attorney, Agent, or Firm — Rossi, Kimms & McDowell LLP

(57) ABSTRACT

A library stores a plurality of presets, each of the preset being a parameter set including a plurality of parameters defining operation of a channel. When an operation to open the library is performed in a setting screen of a processing block of a selected channel, a library screen of the certain processing block is opened. A list of the plurality of presets and a block recall button are displayed on the library screen. When a user selects one preset from the list and operates the block recall button, only a parameter sub-set of the certain processing block is recalled from among the selected preset.

1 Claim, 8 Drawing Sheets

(56) References Cited

U.S. PATENT DOCUMENTS

| | | | |
|---|---|---|---|
| 9,398,390 B2* | 7/2016 | Siciliano | G11B 27/038 |
| 2002/0126156 A1* | 9/2002 | Eastty | G06F 3/04847 |
| | | | 715/810 |
| 2003/0059066 A1* | 3/2003 | Kohyama | G11B 27/038 |
| | | | 381/119 |
| 2004/0159218 A1* | 8/2004 | Aiso | G10H 1/0008 |
| | | | 84/625 |
| 2004/0206192 A1* | 10/2004 | Rieger | G01R 31/2841 |
| | | | 73/862.625 |
| 2005/0254780 A1* | 11/2005 | Takemura | G11B 27/031 |
| | | | 386/241 |
| 2005/0256595 A1* | 11/2005 | Aiso | H04H 60/04 |
| | | | 700/94 |
| 2006/0005130 A1* | 1/2006 | Hiroi | H04H 60/04 |
| | | | 715/700 |
| 2006/0222189 A1* | 10/2006 | Terada | H04H 60/04 |
| | | | 381/119 |
| 2007/0022378 A1* | 1/2007 | Hamada | H04H 60/04 |
| | | | 715/716 |
| 2007/0118815 A1* | 5/2007 | Usui | G06F 3/04847 |
| | | | 715/810 |
| 2009/0290725 A1* | 11/2009 | Huang | H03G 5/165 |
| | | | 381/103 |
| 2010/0246856 A1* | 9/2010 | Suzuki | G06F 3/04847 |
| | | | 381/119 |
| 2011/0013786 A1* | 1/2011 | Odom | H04R 5/04 |
| | | | 381/109 |
| 2012/0109348 A1* | 5/2012 | Matsunaga | G06F 3/04847 |
| | | | 700/94 |
| 2014/0157197 A1* | 6/2014 | Lee | G06F 3/0482 |
| | | | 715/811 |
| 2015/0078584 A1* | 3/2015 | Moon | G10H 1/46 |
| | | | 381/104 |
| 2015/0189438 A1* | 7/2015 | Hampiholi | G06F 3/165 |
| | | | 381/80 |
| 2016/0004405 A1* | 1/2016 | Kim | G06F 3/04847 |
| | | | 715/727 |

OTHER PUBLICATIONS

Chris Liscio, Functional Signal Processing Using Swift, May 2015, 12 pages (Year: 2015).*

Rick Silva, Power Tools for Logic Pro 9, 2010, 8 pages (Year: 2010).*

"Digital Mixing Console M7CL Version 3 Owner'S Manual", published in 2011 by Yamaha Corporation. 12 pages. Cited in Specification.

* cited by examiner

{Fig. 1}
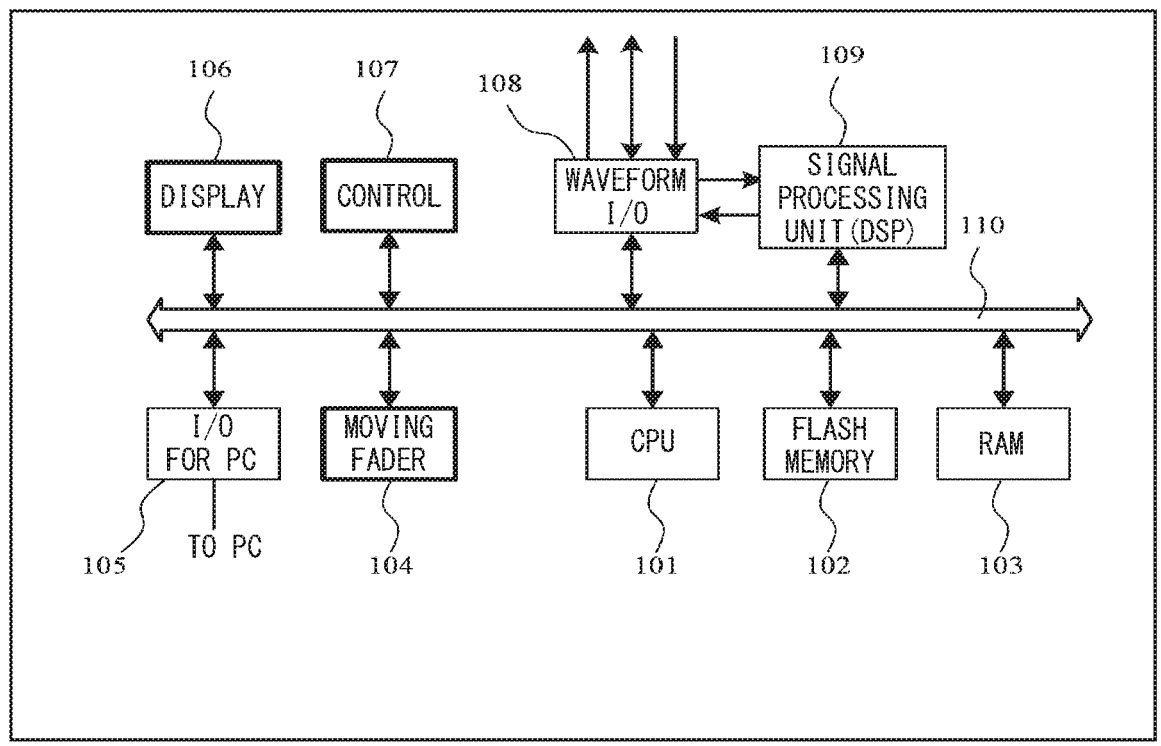
{Fig. 2}
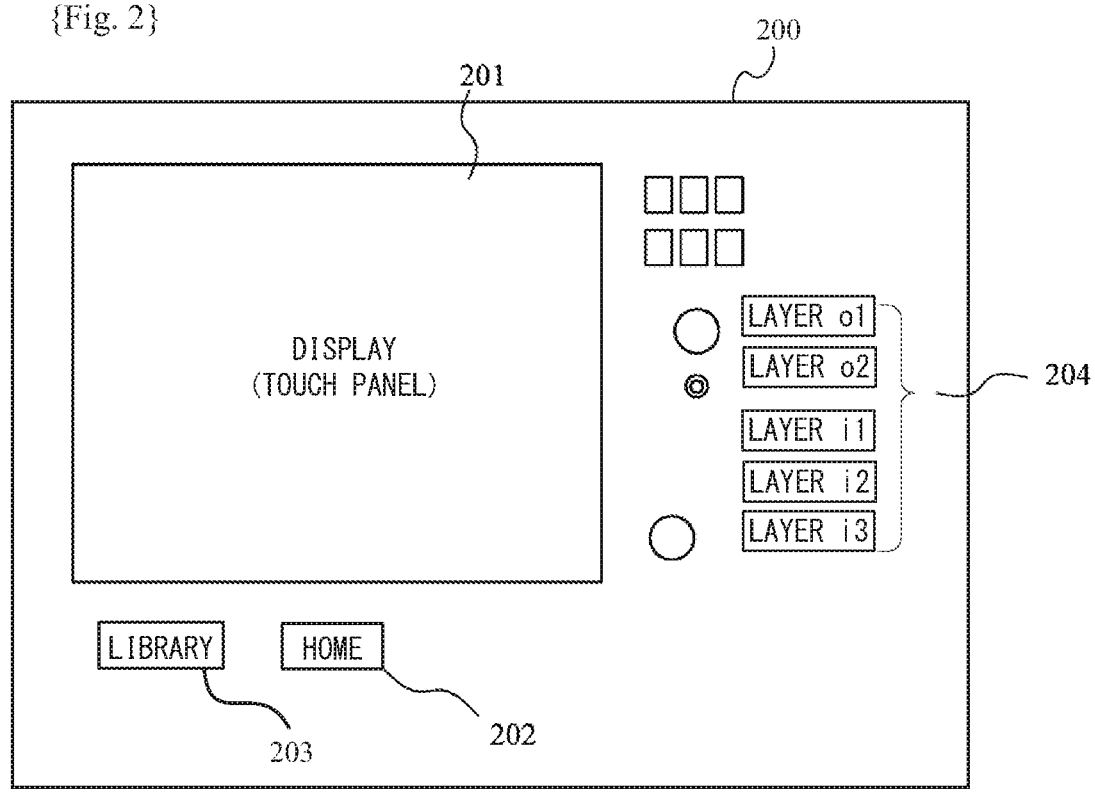

{Fig. 3}
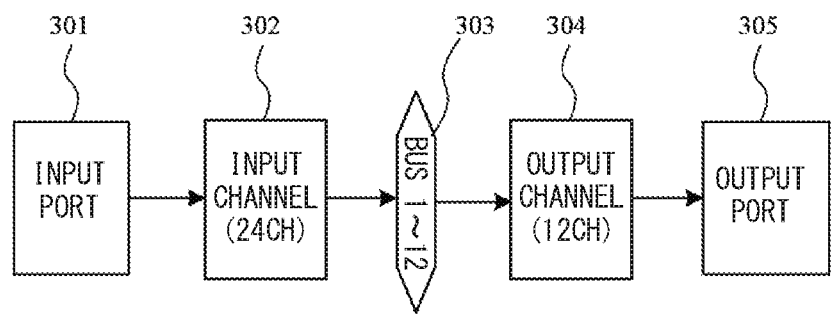
{Fig.4}
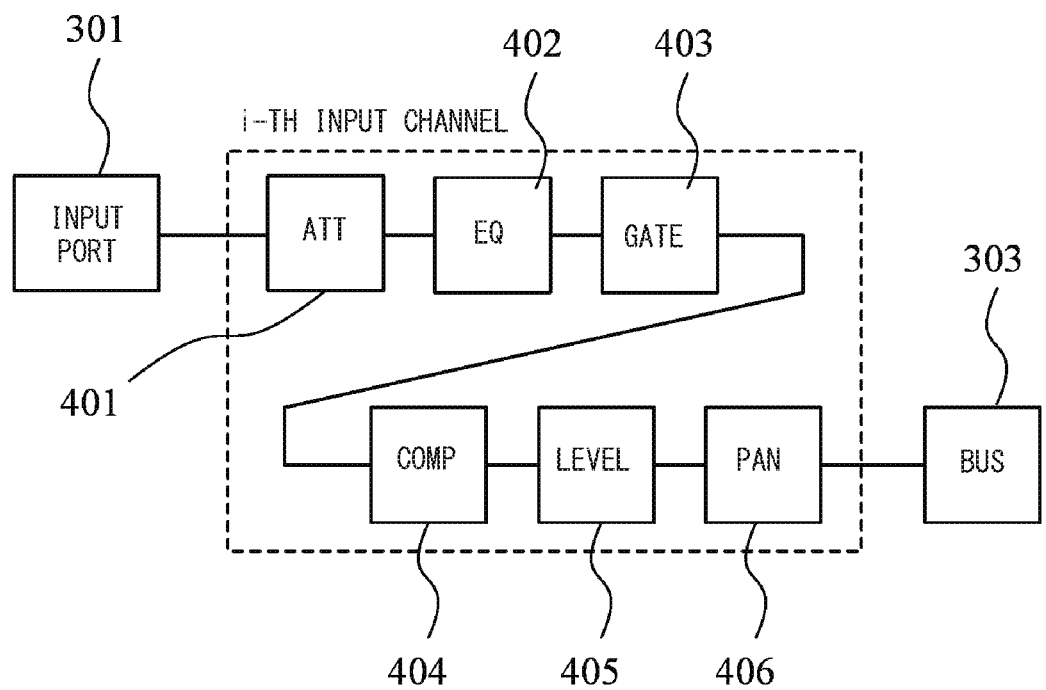

{Fig.5A}
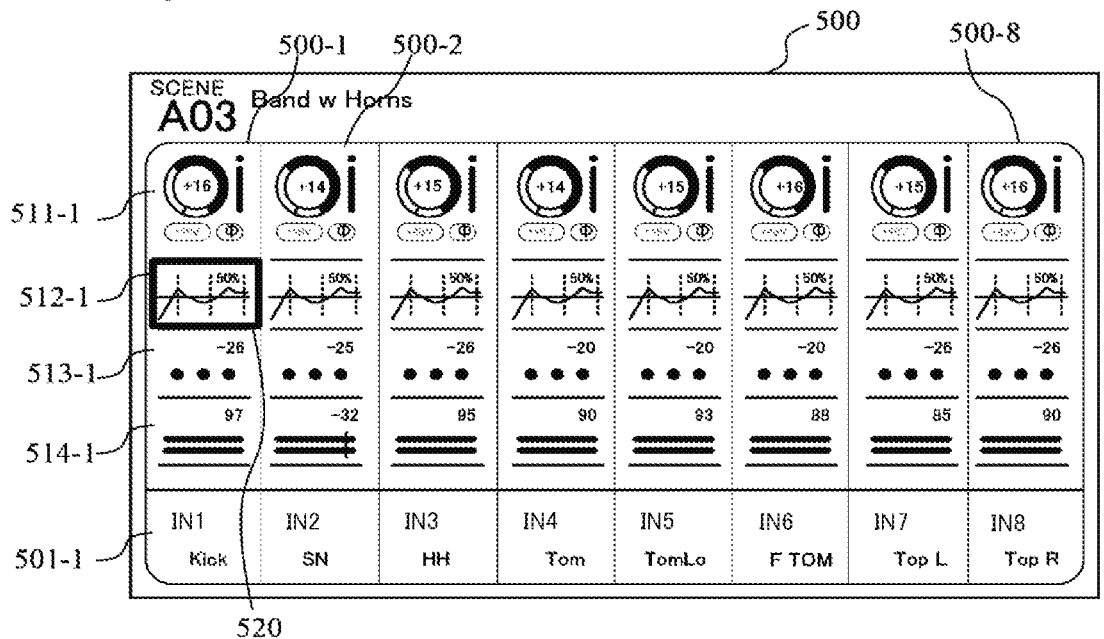
{Fig.5B}
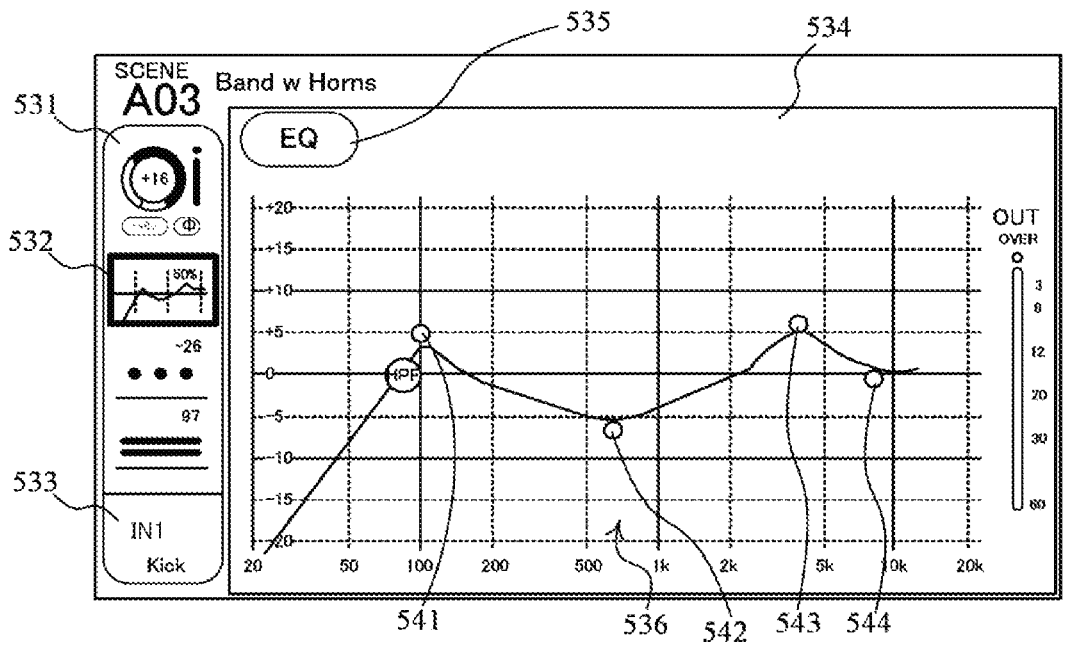

{Fig.5C}
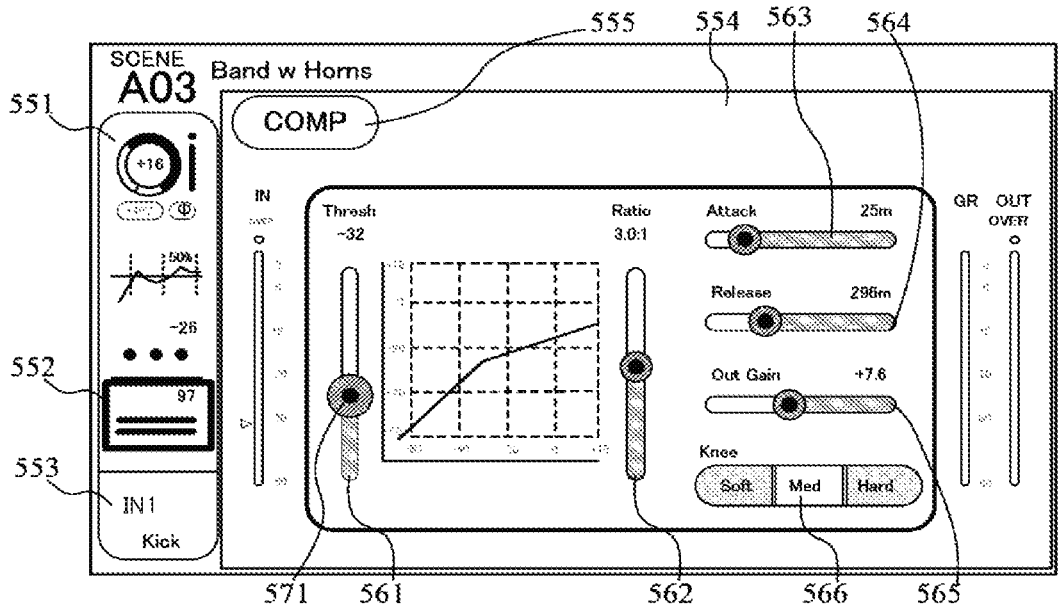
{Fig.6A}
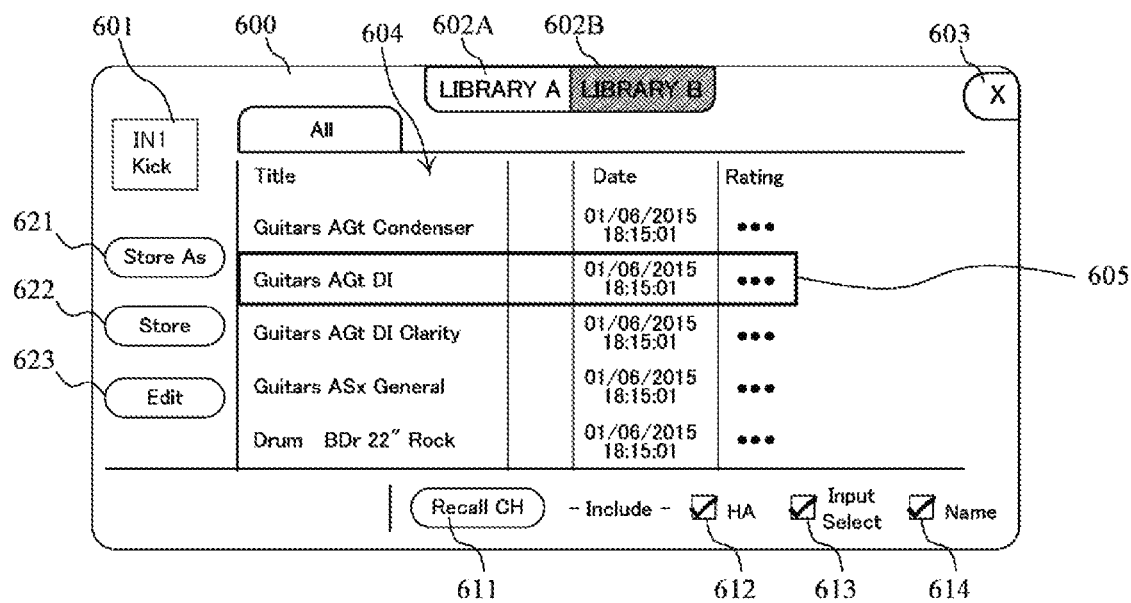

{Fig.6B}
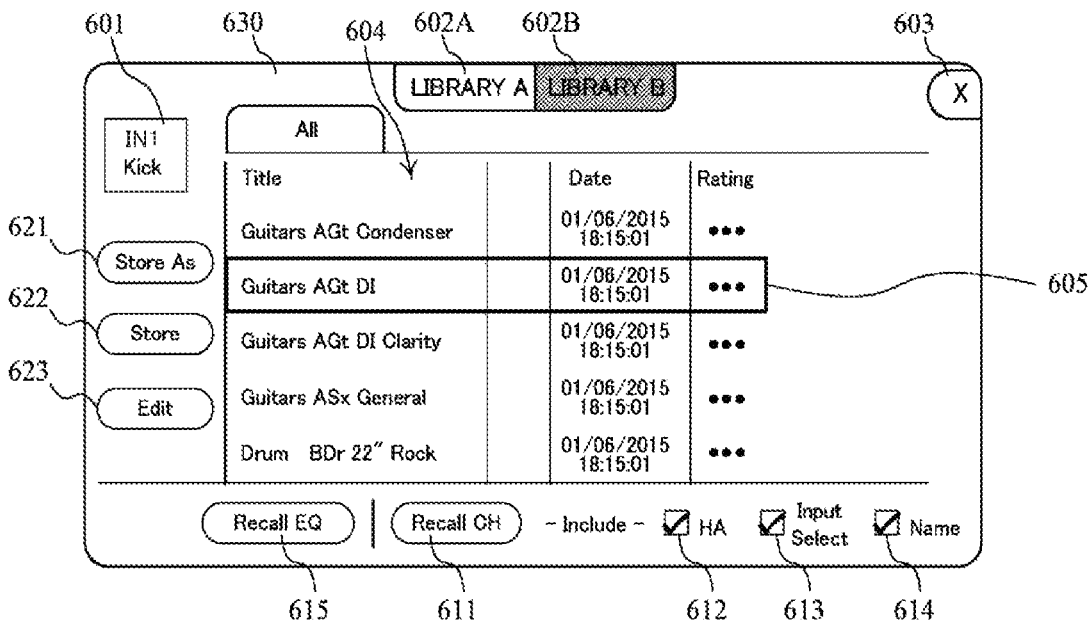
{Fig.6C}
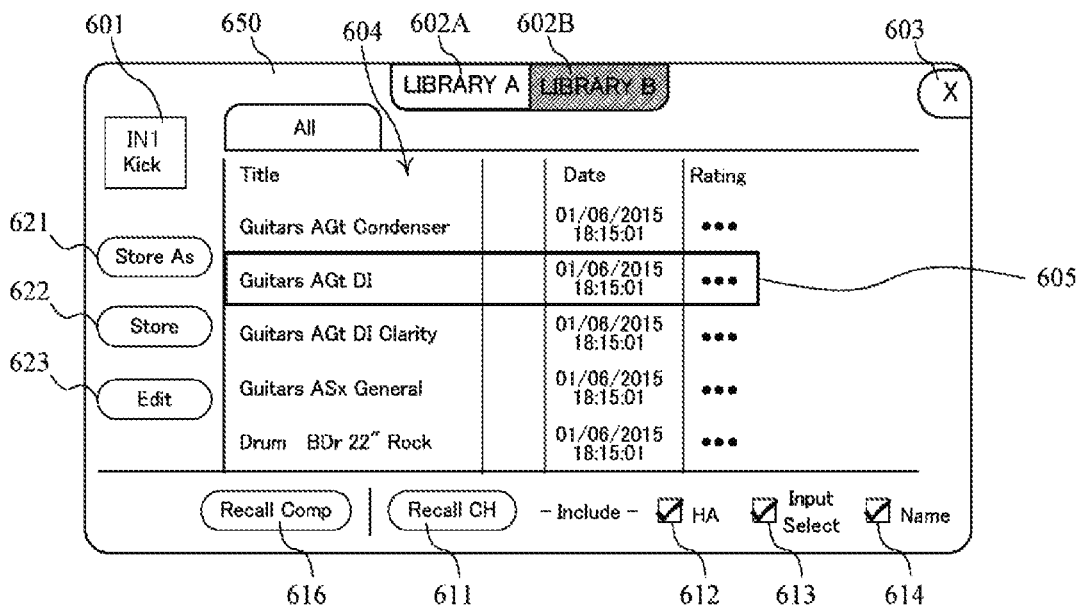

{Fig.7}
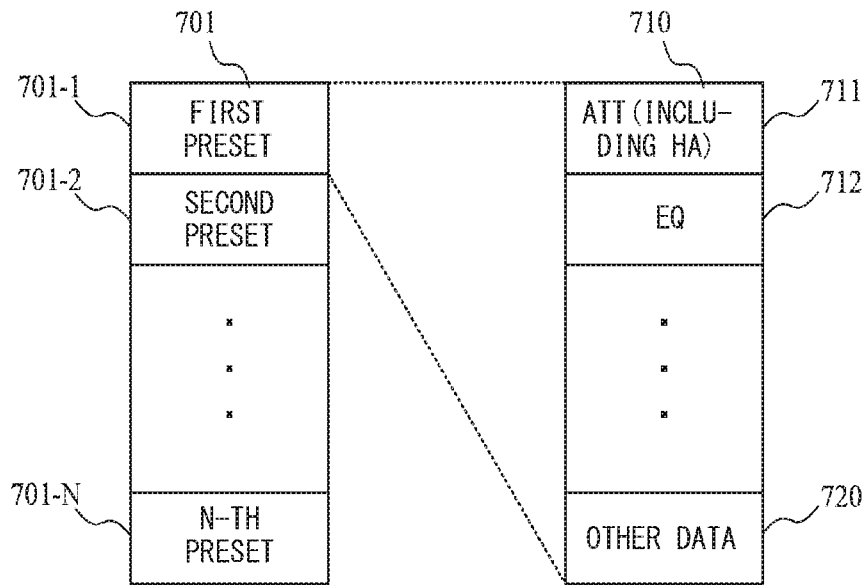
{Fig.8A}
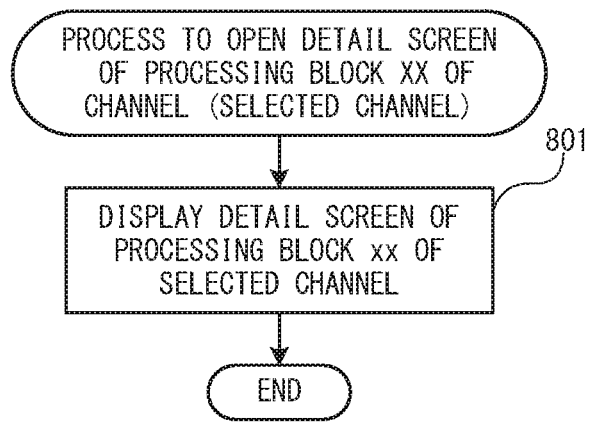

{Fig.8B}
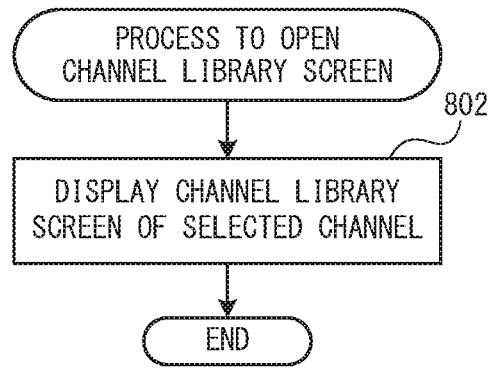
{Fig.8C}
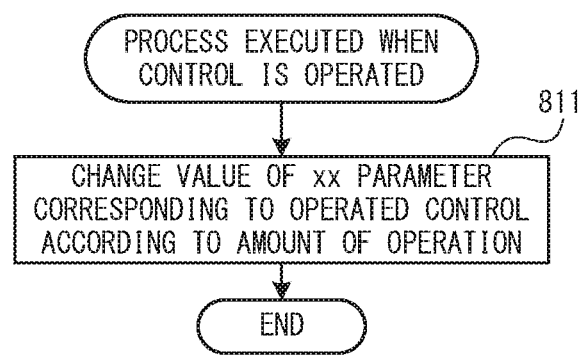
{Fig.8D}
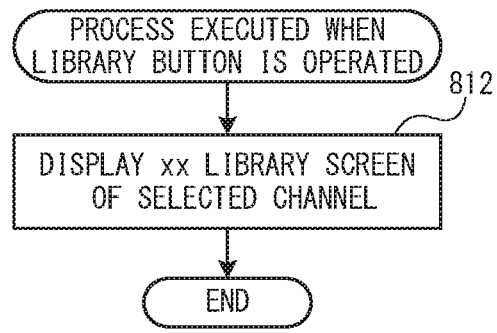
{Fig.8E}
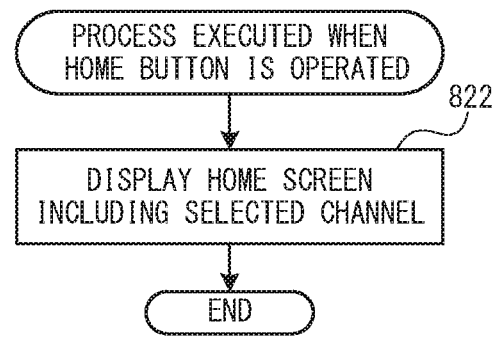

{Fig.9A}
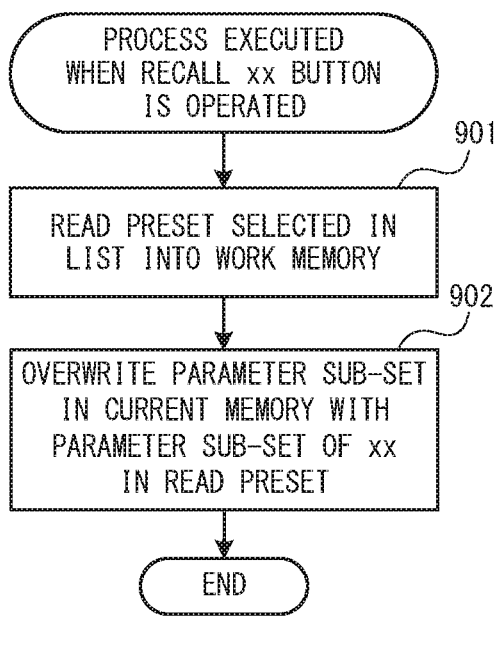
{Fig.9B}
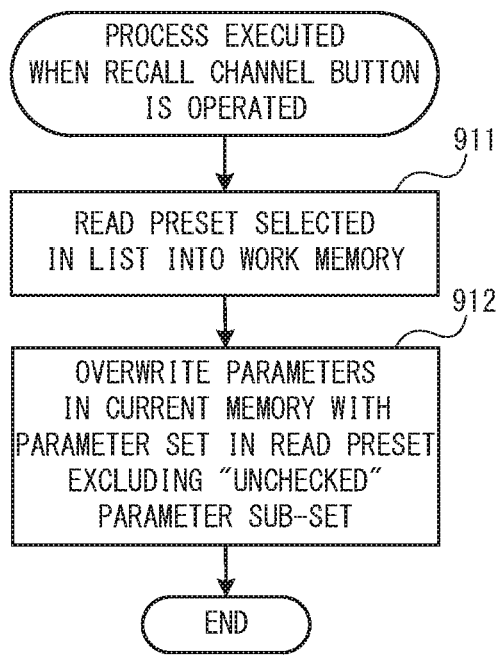
{Fig.9C}
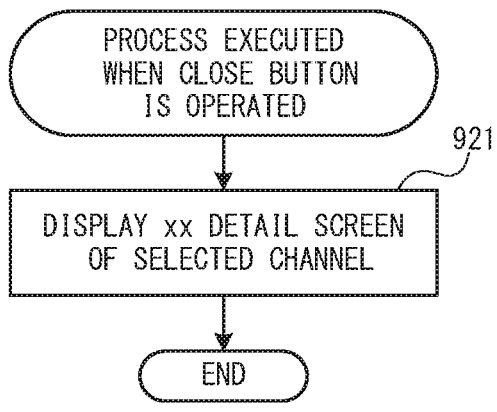
{Fig.9D}
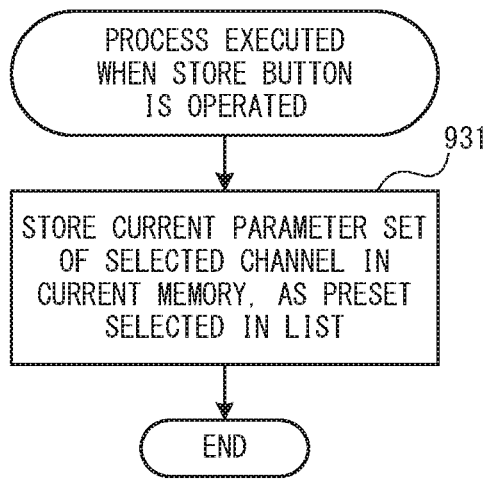

AUDIO SIGNAL PROCESSING DEVICE

TECHNICAL FIELD

The invention relates to an audio signal processing device such as a digital mixer which processes an audio signal.

BACKGROUND ART

An audio signal processing device such as a digital mixer generally includes a plurality of signal processing channels, such as input channels and output channels. Generally, each signal processing channel includes a plurality of processing blocks. For example, for an input channel, the processing blocks are an equalizer (EQ), a compressor (Comp), and the like. Each processing block executes signal processing based on a set of parameters (parameter set) which are set thereto. The values of these parameters can be arbitrarily set for each channel by a user by operating respective controls on a control panel, or the like.

Further, a conventional mixer has an individual library storing for each type of processing block a parameter set which defines operations of the processing block. For example, a mixing console of NPL1 below includes an EQ library, names and stores the parameter set of EQ of an arbitrary channel in the EQ library, and can recall the parameter set stored in the EQ library and set it for the EQ of an arbitrary channel. The mixing console of NPL1 also has a channel library, collectively stores parameter sets for all processing blocks of an arbitrary channel in the channel library, and can recall the parameter sets stored in the channel library and collectively set them to respective processing blocks of an arbitrary channel.

The mixing console of NPL1 has a recall safe function. This is a function to exclude one or more not-desired parameters from target of a recall operation. In the case where a scene which is a set of parameters related to the signal processing of the console is stored in a scene memory and the user directs the console to recall the scene, the console reads out the parameters of the scene from the scene memory, and overwrites a current memory with the parameters except a specified part of parameters to control the signal processing. In other words, the specified part of parameters can be excluded from the target of recall, so as not to overwrite parameter data on the current memory.

CITATION LIST

Non Patent Literature

{NPL1} "DIGITAL MIXING CONSOLE M7CL VERSION 3 OWNER'S MANUAL", Yamaha Corporation, 2011

SUMMARY OF INVENTION

Technical Problem

In the conventional technology, plural parameter sets of individual libraries are provided for every type of processing blocks, and thus it is necessary to manage the plural parameter sets of every one of the plural individual libraries. This not only complicates the entire configuration but also poses a problem that the management is bothersome for the user.

Further, in the conventional recall safe function, it is necessary to open a screen for setting the recall safe to set it. There has been a demand that only a target part of each parameter set can be recalled more easily.

It is an object of the invention to provide, in an audio signal processing device having signal processing channels in which a plurality of processing blocks are connected one another, a management technology convenient for the user to recall from a library a parameter sub-set of each processing block and a parameter set of a processing channel.

Solution to Problem

To attain the above object, an audio signal processing device of the invention is an audio device, including: a channel for processing one audio signal in accordance with a current parameter set, the channel having a plurality of processing blocks connected in series, each processing block processing the one audio signal in accordance with a sub-set of parameters in the current parameter set; a library for storing a plurality of presets, each preset having a data structure same as the current parameter set; a first display controller for controlling a display to display a detail screen of a processing block for displaying a sub-set of parameters of the processing block in a current parameter set of the channel, and accepting an operation from a user on a parameter of the sub-set of parameters displayed on the detail screen to change a value of the parameter in the current parameter set of the channel; a second display controller for controlling the display to display, when the user instructs to open a library while the detail screen of the processing block of the channel is displayed, a block library screen of the processing block, on which a list of the plurality of presets stored in the library and a block recall button is displayed; and a first controller for recalling, when the user selects one preset in the list on the block library screen and operates the block recall button, a sub-set of parameters of the processing block included in the selected preset in the library as a sub-set of parameters of the processing block in the current parameter set of the channel.

In such an audio signal processing device, it is conceivable that a store button is displayed on the block library screen of the processing block, and the audio device further includes a second controller for storing, when the user operates the store button on the block library screen, the current parameter set of the channel to which the processing block belongs as one preset in the library.

It is also conceivable that a channel recall button is displayed on the block library screen of the processing block, and the audio device further includes a third controller for recalling, when the user selects one preset in the list on the block library screen and operates the channel recall button, a parameter set of the selected preset in the library as the current parameter set of the channel to which the processing block belongs.

It is also conceivable that the audio device includes two or more channels as the channel, the audio device further includes: a third display controller for controlling the display to display a home screen for displaying parameters in current parameter sets of the processing channels by juxtaposing one channel another; a fourth display controller for controlling the display to display, when the user instructs to open a library while a channel is selected in the home screen, a channel library screen of the selected channel, on which a list of the plurality of presets stored in the library and a channel recall button is displayed; and a fourth controller for recalling, when the user selects one preset in the list on the channel library screen and operates the channel recall button, a parameter set of the selected preset as a current parameter set of the selected channel.

It is also conceivable that the audio device includes plural pieces of the channels, and the audio device further includes: a third display controller for controlling the display to display a home screen for displaying parameters in current parameter sets of the channels by juxtaposing one channel another, wherein the first display controller is configured to control the display to display, when the user instructs to open a detail screen of a processing block of one of the channels on the home screen, the detail screen of the processing block of the channel.

Advantageous Effects of Invention

According to the above configuration, it is possible to provide a management technology for parameter sets which is convenient when storing in or recalling from a library a parameter set of each processing block or a parameter set of a processing channel.

BRIEF DESCRIPTION OF DRAWINGS

FIG. 1 is a hardware configuration diagram of a digital mixer which is an embodiment of the invention.

FIG. 2 is a partial exterior view of a control panel of the mixer of the embodiment.

FIG. 3 is a block diagram of signal processing function in the mixer of the embodiment.

FIG. 4 is a block diagram illustrating a schematic configuration of an input channel in the mixer of the embodiment.

FIG. 5A illustrates a display example of a home screen.

FIG. 5B illustrates a display example of an EQ detail screen.

FIG. 5C illustrates a display example of a Comp detail screen.

FIG. 6A illustrates a display example of a channel library screen.

FIG. 6B illustrates a display example of an EQ library screen.

FIG. 6C illustrates a display example of a Comp library screen.

FIG. 7 illustrates a data configuration example of a library.

FIG. 8A is a flowchart of process executed by a CPU of the digital mixer.

FIG. 8B is a flowchart of another process executed by the CPU.

FIG. 8C is a flowchart of still another process executed by the CPU.

FIG. 8D is a flowchart of still another process executed by the CPU.

FIG. 8E is a flowchart of still another process executed by the CPU.

FIG. 9A is a flowchart of still another process executed by the CPU.

FIG. 9B is a flowchart of still another process executed by the CPU.

FIG. 9C is a flowchart of still another process executed by the CPU.

FIG. 9D is a flowchart of still another process executed by the CPU.

DESCRIPTION OF EMBODIMENTS

Hereinafter, embodiments of the invention will be described by using drawings.

FIG. 1 is a block diagram illustrating a hardware configuration of a digital mixer which is an embodiment of the invention. A central processing unit (CPU) 101 is a processor for controlling operation of the entire mixer. A flash memory 102 is a non-volatile memory storing various programs executed by the CPU 101, various data, and the like. The flash memory 102 is provided with a library area which will be described later. A random access memory (RAM) 103 is a volatile memory used as a load area and a work area for a program executed by the CPU 101. The RAM 103 is provided with a storage area which is called a current memory, and the CPU 101 controls various types of signal processing performed in a signal processing unit 109 or the like, which will be described later, based on the current values of various parameters stored in the current memory. A moving fader 104 is a control for level setting provided on a control panel of the mixer. An I/O (input and output interface) 105 for PC is an interface for connecting to a PC (personal computer).

A display 106 is a display provided on the control panel for displaying various information, and is a touch panel capable of detecting a touch operation by a user of the mixer. A control 107 includes various controls provided on the control panel to be operated by the user (a rotary encoder, a switch, a button, and so on, other than the moving fader). Note that blocks depicted with bold lines in FIG. 1 are components constituting the control panel. A waveform I/O (audio signal input and output interface) 108 is an interface for exchanging audio signals with external devices. A signal processing unit (DSP) 109 executes various microprograms based on instructions from the CPU 101, so as to perform signal processing, such as mixing processing, effect adding processing, and volume level control processing, on an audio signal inputted via the waveform I/O 108 and output the resultant audio signal after being processed via the waveform I/O 108. The bus 110 is a bus line for connecting the above units, and is a general name given to a control bus, a data bus, and an address bus. Note that the "signal" described in this specification represents an audio signal unless specifically explained otherwise (or unless explained as a control signal).

FIG. 2 illustrates an appearance of (part of) the control panel of the digital mixer of this embodiment. On the control panel 200, various controls are disposed together with a touch panel 201 (display 106 of FIG. 1). 202 denotes a home button for instructing to open a home screen (FIG. 5A), which will be described later, on the touch panel 201. 203 denotes a library button for instructing to open a library screen (FIG. 6A to FIG. 6C), which will be described later, on the touch panel 201. 204 denotes a plurality of layer buttons. Layer buttons i1 to i3 are for opening home screens of respective layers of first to eight input channels IN1 to IN8, ninth to sixteenth input channels IN9 to IN16, and seventeenth to twenty-fourth input channels IN17 to IN24. Layer buttons o1, o2 are for opening home screens of respective layers of first to eighth output channels OUT1 to OUT8 and ninth to twelfth output channels OUT9 to OUT12. These five layer buttons are controlled so that only one of the layer buttons which is pressed down at last by the user is always in an ON state as the layer button of the currently selected layer.

FIG. 3 is a block diagram of signal processing in the mixer realized by the waveform I/O 108 and the DSP 109 of FIG. 2. 301 indicates a plurality of input ports each receiving and converting an analog audio signal inputted from a signal supply source, such as a microphone or a musical instrument, into a digital audio signal and supplying the digital audio signal. Each channel of input channels 302 has a head amplifier (HA) which performs signal processing, such as level control and phase adjustment on an analog or digital audio signal received by an input port, based on parameters (a current parameter set) of each input channel in the current memory. Here, twenty-four input channels are provided. The user sets wirings between input ports and input channels as the user wants, that is, assignment of one input port to each input channel. Each input channel can send a digital audio signal to each of buses 303 (for example twelve buses), with a level of the audio signal controlled independently for each bus and for each input channel. Each bus 303 mixes signals supplied from any of the input channels. The mixed signal of the bus 303 is supplied to an output channel 304 corresponding to the bus. The buses 303 and output channels 304 are corresponded one by one. Each output channel performs various signal processings on the supplied signal based on the values of parameters (a current parameter set) of the output channel in the current memory. 305 indicates a plurality of output ports each converting an audio signal supplied from an output channel of the output channels 304 into an analog audio signal, and outputting the analog audio signal.

FIG. 4 is a block diagram illustrating one channel out of the input channels 302 which comprises a plurality of processing blocks connected in series. The first block is an attenuator (ATT) 401 which performs, on the signal inputted to the channel, level control in an entrance portion thereof. The second block is an equalizer (EQ) 402 adjusts frequency characteristics of a signal. A gate (GATE) 403 is a noise gate narrowing the level of a signal so that no noise remains when the signal level decreases. A compressor (COMP) 404 performs automatic gain adjustment to compress the dynamic range of a signal. A level (LEVEL) 405 is a level adjustment unit adjusting the transmission level of a signal to each bus. A panning (PAN) 406 controls leftward-rightward orientation (panning) when a signal is outputted in stereo. The signal processing performed in each block is controlled based on values of parameters of a parameter sub-set (a current parameter sub-set) corresponding to the block, stored in a storage area of a current parameter set of the one channel in the current memory. In this embodiment, a parameter set of a channel is called as a "parameter set" or a "set of parameters", and a parameter set of a processing block is called as a "parameter sub-set" or a "sub-set of parameters". In the same way, each of the output channels 304 comprises a series of processing blocks, such as an equalizer, a compressor, and a level adjustment unit (not illustrated), and is controlled by values of a plurality of current parameter sub-sets corresponding to the processing blocks of the output channel in the current memory.

FIG. 5A illustrates an example of the home screen of the layers of input channels IN1 to IN8. This screen 500 is displayed when the user turns on the layer button i1, or when the user turns on the home button 202 when one of the input channels IN1 to IN8 is selected. The home screen of another layer is displayed likewise by an operation of the layer button or the home button.

500-1 to 500-8 each denote a vertically long area displaying some parameters of each channel of the input channels IN1 to IN8 (hereinafter referred to as a "channel display area"). In the channel display area of one channel, 500-1 for example, 501-1 denotes a display of the channel number and name of the input channel displayed in the area. This display 501-1 is always displayed fixedly on a lower side of the screen in the home screen. Four areas 511-1, 512-1, 513-1, and 514-1 are areas for displaying some parameters among current parameter sub-sets of the respective processing blocks of the attenuator (and the head amplifier HA of the input port connected with the input channel) 401, the equalizer 402, the gate 403, and the compressor 404 of the input channel in this order (hereinafter, an area for displaying parameters of one processing block is called a "block display area").

Note that the same explanation as the channel display area 500-1 for the input channel IN1 applies to the display areas 500-2 to 500-8 of the input channels IN2 to IN8. To the above numbers 511 to 514, "-2" is added as an index so as to represent the respective block display areas of the input channel IN2, and likewise "-3" to "-8" are added as indexes to those of the channels thereafter so as to represent the block display areas of these channels thereafter.

On lower sides of the block display areas 514-1 to 514-8 of the respective channels for displaying the parameters of the compressor 404, block display areas for displaying parameters of the level 405 and the panning 406 of the respective channels are hidden, and when upward swiping is performed on a displayed block display area, the block display areas are scrolled upward and these hidden block display areas are displayed.

520 denotes a cursor displayed as a bold line. By touching any block display area once in the home screen, the user can set the cursor 520 to the touched block display area. The block display area to which the cursor 520 is set is called a "selected" area or an area in a "selected state". Further, the channel of the selected block display area is called a "selected channel", namely a channel selected as a target of user operation. Only one block display area is in the selected state on the screen. In FIG. 5A, the block display area 512-1 displaying the parameters of EQ in the channel display area 500-1 of the input channel IN1 is in the selected state. When the user touches the block display area of a processing block in the selected state again, a detail screen of the processing block for editing the current parameter sub-set of the processing block of the selected channel is displayed.

As an example of the detail screen, FIG. 5B illustrates a detail screen of EQ (a EQ detail screen) displayed by further touching by the user the block display area 512-1 in the home screen 500 of FIG. 5A while the area 512-1 is in a selected state. In an area 531 on the left side of the screen, the same information as in the channel display area of the selected channel is displayed. Here, since the selected channel is the input channel IN1, the same information as in the channel display area 500-1 of the input channel IN1 in FIG. 5A is displayed in the area 531, and the input channel IN1 is displayed as the presently selected channel in the area 533 provided in a lower part of the area 531. Of course, in the case of another selected channel, for example when the block display area 512-3 of the input channel IN3 is touched twice and the EQ detail screen is displayed, then the selected channel is the input channel IN3, and the same information as in the channel display area 500-3 in FIG. 5A is displayed in the area 531. Further, since the detail screen displayed is of EQ, the cursor 532 is set on the parameter display area of EQ in the area 531.

534 denotes a detail screen of EQ for editing a current parameter sub-set of EQ, and 535 denotes a header display indicating that the detail screen 534 is for editing the parameter sub-set of EQ. 536 denotes an EQ graph indicating the characteristics of EQ controlled by the current parameter sub-set. 541 to 544 are pointers indicating the peak positions of respective bands of EQ. By swiping upward or downward (in a direction to increase or decrease gain) while touching one of the pointers 541 to 544, the gain of each band can be increased or decreased.

As another example of the detail screen, FIG. 5C illustrates a detail screen of Comp (a Comp detail screen) displayed by further touching by the user the block display area 514-1 in the home screen 500 in FIG. 5A while the block display area 514-1 is in a selected state. 551 denotes a display of the selected channel similar to the area 531 in FIG. 5B. Since the detail screen displayed is of Comp, the cursor 552 is set on the parameter display area of Comp in the area 551.

554 denotes a detailed screen for editing a current parameter sub-set of Comp, and 555 denotes a header display indicating that this detail screen is for editing the parameter sub-set of Comp. 561 to 566 denote displays of controls for editing a current sub-set of parameters defining a signal processing operation of Comp. The controls 561 to 565 are slider-type controls for editing a threshold, a ratio, and so on. A slider-type control allows changing a value of a corresponding parameter by sliding a knob part (knob 571 for the control 561 for example) of the slider-type control on the screen in a longitudinal direction of the control while touching the knob part with a finger. The control 566 is a button-type control and allows the user to alternatively set a value by touching any one of three buttons for Soft, Med, and Hard.

While the detail screens of EQ and Comp are described above, the same applies to another processing block, where values of a current sub-set of parameters of the processing block can be edited by the user in detail in the detail screen of the processing block. Note that when the user operates any control of a parameter on the above-described home screen or detail screen, the current value of the parameter corresponding to the operated control in the current memory is changed in accordance with the amount of operation thereof. In the current memory, the current parameter sets of all the processing blocks illustrated in FIG. 3, such as parameter sub-sets of respective processing blocks of input channels and output channels and parameter sub-sets of respective input ports and output ports, are stored. Values of the parameters (current parameters) in the current memory are regularly reflected on signal processing in the DSP 109 by background processing (not illustrated) of the CPU 101.

FIG. 6A illustrates an example of a channel library screen 600 displayed when the library button 203 on the home screen (FIG. 5A) is turned on by the user. When the library button 203 is turned on, the cursor 520 is located on one of the block display areas of the channel display area 500-1 of the input channel IN1 in the home screen 500. Thus, the channel library screen is opened for the selected channel IN1.

601 denotes a display of the channel number and name of the selected channel as the target of the channel library screen 600. 602A and 602B are library buttons. The mixer of this embodiment has two libraries A and B, and one of the libraries is selected by the user using the library buttons 602A, 602B. In the drawing, the library A is selected. 603 denotes a close button. When this button is touched, the channel library screen 600 is closed, returning to the original home screen 500. 604 denotes a list of presets (hereinafter referred to as a "list") stored in the library. Each line of the list 604 corresponds to one preset, and the name (Title) and the date of storage (Date), and so on of each preset are displayed. The name (Title) is a preset name given freely by the user. 605 denotes a cursor. By touching one of the presets of respective lines in the list 604, the cursor 605 can be set on any preset in the list.

611 denotes a recall channel button, and when this button is touched, a preset specified by the cursor 605 is recalled onto the selected channel. That is, describing in the case of FIG. 6A, the specified preset is read out from the library, and is written as the current parameter set of the selected channel (in this case, the channel IN1) into the current memory which defines the operation of the input channel IN1 and the operation of the head amplifier wired to the input channel IN1.

612 to 614 denote boxes called inclusion check boxes. By touching each inclusion check box with a finger, the state of the check box is toggled between a checked state and an un-checked state.

The check box 612 specifies whether or not the parameter sub-set of the head amplifier (input port) wired to the attenuator 401 is to be included in the recall target of the recall process. When the check box 612 is checked, the parameter sub-set of the head amplifier becomes a recall target, and is written as the current parameter sub-set of the head amplifier wired to the selected channel into the current memory. When the check box 612 is unchecked, the parameter sub-set of the head amplifier is excluded from the recall target, and is not written as the current parameter sub-set. Likewise, the check box 613 specifies whether or not input port assignment information indicating assignment of an input port to the selected channel is to be included in the recall target of the recall process. The check box 614 specifies whether or not the channel name given to the selected channel is to be included in the recall target of the recall process.

The reason for providing the check boxes 612 to 614 is that these parameters are adjusted depending on the use environment of the mixer. In a case where a certain event is to be carried out in several event sites, it is conceivable that once a preset for a certain input channel is prepared in the first cite, and the same preset could be used in any other sites. However, the head amplifier of the input channel should be adjusted depending on various factors, such as a microphone collecting sound, a distance from the sound source to the microphone, and a person who plays the sound. Further, with respect to wiring of an input port to the input channel, each port receives which sound from which microphone is different for each event. Therefore, to use the parameter sub-sets of the head amplifier or the wiring included in the same preset is not always adequate. In some cases, the parameter sub-set of the head amplifier and the assignment of the input ports are to be set differently for each site and each event, and then the checks of the check boxes 612, 613 should be unchecked. Thus, if the settings of the head amplifier and the wiring of the input ports should be adjusted individually for each site, then the current parameter set of the channel can be set up easily by recalling the same preset with the check boxes 612, 613 unchecked. The same applies to the name given to the channel by the user. If a name to be given to the channel is different for each site, then, by unchecking the check box 614, the preset can be recalled without changing the channel name of the channel.

621 denotes a store-as button, and by touching this button, the current parameter set of the selected channel in the current memory (including the parameter sub-set of the head amplifier wired with the selected channel) can be newly stored in the library with a given preset name (Title). 622 denotes a store button, and by touching this button, the parameter set of the selected channel in the current memory can be stored (overwritten) in the library as the preset on which the cursor 605 is set. 623 is an edit button, and by touching this button, the preset name of the preset on which the cursor 605 is set can be edited.

FIG. 6B illustrates an example of an EQ library screen 630 displayed when the library button 203 is turned on while the EQ detail screen of FIG. 5B is displayed. The selected channel in the EQ library screen 630 is the same as the selected channel in the original EQ detail screen of FIG. 5B. The same display elements are denoted by the same numbers in the EQ library screen 630 of FIG. 6B and the channel library screen 600 of FIG. 6A. These display elements of FIG. 6B function similarly to those described in FIG. 6A. A difference from the channel library screen 600 is that a recall EQ button 615 is displayed on the EQ library screen 630.

When the recall EQ button 615 is touched with a finger, the parameter sub-set of EQ in the specified preset is recalled onto the EQ of the selected channel. That is, describing in the case of FIG. 6B, the parameter sub-set of EQ in the preset selected by the cursor 605 is read from the library, and is written in the current memory as the current parameter sub-set of the EQ of the selected channel (in this case, IN1). At this moment, parameter sub-sets of processing blocks other than the EQ in the preset are not written in the current memory.

FIG. 6C illustrates an example of a Comp library screen 650 displayed when the library button 203 is turned on while the Comp detail screen of FIG. 5C is displayed. The description of FIG. 6B is about the EQ, but replacing the EQ with Comp results in the description of FIG. 6C. However, since FIG. 6C is the library screen opened from the Comp detail screen of FIG. 5C, a recall Comp button 616 is displayed instead of the recall EQ button 615. By touching the recall Comp button 616 with a finger, only the parameter sub-set of Comp in the specified preset is recalled to the parameter set of Comp of the selected channel in the current memory.

Although the EQ and Comp are described as examples in FIG. 6B and FIG. 6C, the same applies to the other processing blocks. When the library button 203 is turned on while the detail screen of a processing block xx for editing the parameter sub-set of the processing block xx is displayed, the library screen of the processing block xx is displayed. On this library screen, a recall xx button (corresponding to button 615 of FIG. 6B or button 616 of FIG. 6C) for instructing to recall only the parameter sub-set of the certain processing block in a preset to the current memory is displayed. Note that "xx" is an identifier indicating any one of plural types of processing blocks, such as EQ and COMP (that is, it does not indicate a certain channel).

Obviously, when the EQ detail screen of FIG. 5B is displayed, the user has opened the EQ detail screen with an intention to edit the parameter sub-set of EQ. Therefore, when the library button 203 is turned on while the EQ detail screen is displayed, it can be assumed that the user desires to operate the library with a focus on the parameter sub-set of EQ. Accordingly, on the EQ library screen 630 opened from the EQ detail screen, the recall EQ button 615 for recalling only the parameter sub-set of EQ is displayed for increasing its convenience. The same applies when the Comp library screen 650 is opened from the Comp detail screen, and moreover, the same applies when the library screen for another processing block is opened from the detail screen of the processing block for editing parameters of the processing block. On the other hand, the recall xx button is not displayed on the channel library screen 600 of FIG. 6A. This is because when the channel library screen 600 is opened from the home screen 500, it can be assumed that the user desires to operate the library in units of channels, and does not desire to operate the library for a certain processing block.

Next, with reference to FIG. 7, a data configuration of the channel library provided in the flash memory 102 will be described. The library 701 includes an area for storing a plurality of presets. In FIG. 7, the library has areas 701-1 to 701-N storing N presets. A term "n-th preset" (n is 1 to N) refers to an area 701-n or refers to a parameter set stored in the area 701-n. One preset (a parameter set) includes parameter sub-sets for defining the operation of a plurality of processing blocks of one input channel when the preset is recalled in the channel. For example, one preset 710 includes a sub-set of parameters 711 for the attenuator (including parameters of the head amplifier to be connected to the channel), a sub-set of parameters 712 for EQ, and so on. One preset also includes other data 720, which are, for example, name data of the one preset, wiring data specifying the input port wired to the channel, name data of the channel, and so on. As described above, one or more of the parameter sub-set of the head amplifier, the wiring data of the channel, and the name data of the channel can be excluded from the recall target by un-checking the corresponding inclusion check box.

Although the term "preset" is often used in the sense of a read-only parameter set in a library in a mixer, but in the present application, the term is not limited to "read-only", and a parameter set of a channel can be stored in or recalled from a library by the user as a "preset".

Next, with reference to FIGS. 8A to 8E and 9A to 9C, processing executed by the CPU 101 for realizing the above operation will be explained.

FIG. 8A illustrates a flowchart of process to open a detail screen (FIG. 5B or 5C) of a processing block xx (a xx detail screen) of a channel (selected channel). While one block display area of one channel (selected channel) in the home screen of FIG. 5A is in the selected state, when the user touches the one block display area, the process in FIG. 8A is executed. In step 801, the CPU 101 controls the display 106 to display the detail screen of the processing block xx (a processing block corresponding to the one block display area) of the selected channel.

FIG. 8B illustrates a flowchart of process to open the channel library screen. While the home screen of FIG. 5A is displayed, when the library button 203 is turned on by the user, the process in FIG. 8B is executed. In step 802, the CPU 101 controls the display 106 to display the channel library screen (FIG. 6A) of a selected channel. Note that, on the home screen, the channel having one block display area, on which the cursor is located, is the selected channel, at the time when the library button 203 is turned on.

FIG. 8C illustrates a flowchart of process executed when the user operates any of the controls on the detail screen (such as FIG. 5B or 5C) of one processing block xx of the selected channel. In step 811, the CPU 101 changes the value of the parameter (included in the parameter sub-set of the processing block xx of the selected channel) corresponding to the operated control in the current memory according to the amount of the operation.

FIG. 8D illustrates a flowchart of process executed when, while the detail screen (such as FIG. 5B or 5C) of one processing block xx of the selected channel is displayed, the library button 203 is turned on by the user. In step 812, the CPU 101 controls the display 106 to display a xx library screen (a block library screen) of the processing block xx of the selected channel. The xx library screen is, for example, the EQ library screen when the originally displayed screen is the detail screen of EQ, or is the Comp library screen when the originally displayed screen is the detail screen of Comp. As is described with FIGS. 6B, 6C, in the xx library screen, the recall xx button for instructing to recall only the parameter sub-set of the processing block xx is displayed.

FIG. 8E illustrates a flowchart of process executed when the home button 202 is turned on by the user. Note that irrespective of the screen displayed immediately previously, this process is executed whenever the home button 202 is turned on. In step 822, the CPU 101 controls the display 106 to display the home screen (FIG. 5A) including the selected channel at this time point.

FIG. 9A illustrates a flowchart of process executed when, while the xx library screen of the selected channel is displayed, the recall xx button in the xx library screen is touched (operated) by the user. In step 901, the CPU 101 reads the preset presently selected in the list (preset on which the cursor is set) is read into the work memory. In step 902, the CPU 101 overwrites the parameter sub-set of the processing block xx of the selected channel in the current memory with the parameter sub-set of the processing block xx in the preset read into the work memory.

FIG. 9B illustrates a flowchart of process executed when, while the xx library screen of the selected channel is displayed, the recall channel button in the xx library screen is touched by the user. In step 911, the CPU 101 reads the preset selected in the list (preset on which the cursor is set) into the work memory. In step 912, the CPU 101 overwrites, with the parameter set of a channel excluding any parameter sub-sets for which the inclusion check box is unchecked in the preset read into the work memory, corresponding portions of the parameter set of the selected channel and the parameter sub-set of the head amplifier wired to the selected channel in the current memory. Note that when the recall channel button is touched on the channel library screen, the same process as FIG. 9B is executed.

FIG. 9C illustrates a flowchart of process executed when, while the xx library screen of the selected channel is displayed, the close button in the xx library screen is touched by the user. In step 921, the CPU 101 controls the display 106 to close the xx library screen and display the xx detail screen of the selected channel again. Note that when the close button is touched in the channel library screen, process is executed to close the channel library screen and display again the home screen including the selected channel.

FIG. 9D illustrates a flowchart of process executed when, while a preset in the list is selected on any library screen (FIG. 6C, FIG. 6D, or FIG. 6E) of the selected channel by the user, the store button 622 on the library screen is touched by the user. In step 931, the CPU 101 stores the current parameter set of the selected channel in the current memory as the selected preset. Note that process executed when the store-as button 621 is touched is basically same as this, which differs only in that the user specifies a preset name and the current parameter set is stored in the library with the specified preset name.

Note that, in response to the touch on the store button 622 in the xx library screen, the CPU 101 stores the current parameter set of the processing channel (that is, the selected channel) to which the processing block xx belongs, as one preset in the library.

In the above embodiment, one list is shared between library screens of a plurality of different processing blocks. Thus, the configuration of a library is simple, and management by the user is easy. Further, a block library screen is displayed, on which different block recall buttons are automatically provided depending on a detail screen of a processing block from which the block library screen is opened. Thus, the parameter sub-set of the processing block corresponding to the detail screen can be recalled by the user through an easy operation, which improves convenience of the library. By providing a store button on the block library screen, regardless of by which library screen of which processing block a library is stored, the library can be stored as one preset in the same list. By providing a channel recall button on the block library screen, the parameter set of the channel can be recalled as necessary. Moreover, even if it is enabled to instruct to open a channel library screen in the home screen, a list to be displayed on the channel library screen can be shared with the list for the block library screens, and thus the library configuration becomes simple.

The mixer of the embodiment is preferably applied to the cases where presets are supplied from the manufacturer or presets are shared by plural users. For this purpose, the mixer may be configured to allow registering and recalling a preset provided via a network or a storage medium in and from a library. The user can recall a newly obtained preset to a channel, or can recall from the preset only a parameter sub-set of one of processing blocks such as EQ, Comp, or the like of the channel, and thus can use a limited number of presets which are obtained from another person conveniently in a plurality of processing blocks. Further, it is often the case where settings of HA, wiring between an input port and an input channel, or the like cannot be used as they are in a preset obtained from another person, but in the mixer, they can be removed easily from the recall target by unchecking the inclusion check boxes. Thus, the mixer is also convenient in this point. Regarding a preset which is supposed to be provided to other people, for example, a "comment indicating the purpose of use or the like of the channel" or the like may be added to the preset. The user can determine the way of use of the obtained preset by referring to it.

Note that in the above-described embodiment, a detail screen of a processing block is displayed when a block display area of the processing block being selected in the home screen of FIG. 5A is touched by the user, but the method of opening the detail screen in accordance with the user's instruction is not limited to this. For example, it may be such that, when the block display area of a certain processing block of a certain channel is touched, the detail screen for the certain processing block opens regardless of whether the certain processing block being selected or not. Alternatively, it may be such that, with a plurality of buttons corresponding to respective processing blocks being prepared, when one of the buttons is operated while certain channel is selected, the detail screen of the processing block corresponding to the operated button of the certain channel opens.

In the above-described embodiment, although the processing regarding the library for the input channel of the mixer is described as an example, the present invention is applicable to processing regarding libraries for the output channel of the mixer and, besides that, libraries for various processing blocks of any channel of any audio device, such as a recorder, an amplifier, or a speaker. Further, when there are different types of channels such as an input channel and an output channel, a library may be separated for each type of channel, or a common library may be used. The structure of the library is not limited to that in FIG. 7.

The inclusion check boxes are described with an example of three types with reference numerals of 612 to 614, but inclusion check boxes may be provided to any one or a plurality of parameters included in the preset of a channel.

The display in the above-described embodiment is a touch panel having a touch sensor, but it may be replaced with a display having no touch sensor and a pointing device, such as a mouse or a touch pad. Further, the home button or the library button may be a button displayed on the screen instead of a physical button. Moreover, the recall button or the close button may be a physical button instead of a button displayed on the screen. The display need not be one display, and two or more of the home screen, the detail screen and the library screen may be displayed separately on displays at the same time. For example, while the detail screen of a certain block is opened on one display, the library screen of the certain block may be displayed on another display. Further, the display is not limited to the display provided in the mixer main body, and may be an external display provided in a personal computer or a tablet terminal.

REFERENCE SIGNS LIST

101 . . . central processing unit (CPU), 102 . . . flash memory, 103 . . . RAM, 104 . . . moving fader, 106 . . . display, 107 . . . control, 108 . . . waveform I/O, 109 . . . signal processing unit.

The invention claimed is:

1. An audio device comprising:
   a signal processor configured to process an audio signal in accordance with a current parameter set in a channel having a plurality of processing blocks connected in series, each processing block processing the audio signal in accordance with a sub-set of parameters in the current parameter set;
   a memory storing a library of a plurality of presets, each preset having a data structure same as the current parameter set and including the sub-set of parameters corresponding to each processing block;
   a processor configured to provide a plurality of tasks, including:
      a first display control task that:
         controls a display to display a detail screen of only a first processing block, among the plurality of processing blocks, for displaying a sub-set of parameters of the first processing block in the current parameter set of the channel, wherein the block library screen of the first processing block displays a channel recall button; and
         accepts an operation from a user on a target parameter of the sub-set of parameters of only the first processing block, among the plurality of processing blocks, displayed on the detail screen via a control corresponding to the target parameter displayed on the detail screen to change a value of the target parameter in the current parameter set of the channel in accordance with an amount of the operation on the control;
      a second display control task that controls the display to display, upon receiving a user instruction to open the library while the detail screen of only the first processing block, among the plurality of processing blocks, of the channel is displayed, a block library screen of only the first processing block, among the plurality of processing blocks, displaying a list of the plurality of presets stored in the library and a block recall button;
      a first control task that, upon receiving a user selection of one preset in the list on the block library screen of only the first processing block, among the plurality of processing blocks, and a user operation of the block recall button, recalls a sub-set of parameters of only the first processing block, among the plurality of processing blocks, included in the selected preset in the library as the sub-set of parameters of only the first processing block, among the plurality of processing blocks, in the current parameter set of the channel; and
      a second control task that, upon receiving a user selection of one preset in the list on the block library screen and a user operation of the channel recall button, recalls the parameter set of the selected preset in the library as the current parameter set of the channel to which the first processing block belongs.

* * * * *